(12) United States Patent
Liu et al.

(10) Patent No.: US 11,754,880 B1
(45) Date of Patent: Sep. 12, 2023

(54) BACKLIGHT MODULE AND DISPLAY DEVICE

(71) Applicant: HKC CORPORATION LIMITED, Shenzhen (CN)

(72) Inventors: Hao Liu, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/089,594

(22) Filed: Dec. 28, 2022

(30) Foreign Application Priority Data

May 6, 2022 (CN) .......................... 202210489725.6

(51) Int. Cl.
*G02F 1/00* (2006.01)
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133608* (2013.01); *G02F 1/133612* (2021.01)

(58) Field of Classification Search
CPC .................................. G02F 1/133602–133618
See application file for complete search history.

(56) References Cited

U.S. PATENT DOCUMENTS

| 2007/0195524 | A1* | 8/2007 | Seo ..................... H01L 25/0753 362/228 |
| 2009/0290094 | A1 | 11/2009 | Shimura et al. |
| 2022/0252939 | A1* | 8/2022 | Wang ................. G02F 1/133603 |

FOREIGN PATENT DOCUMENTS

| CN | 101571264 A | | 11/2009 |
| CN | 109523909 A | | 3/2019 |
| CN | 210666266 U | | 6/2020 |
| CN | 111679498 A | | 9/2020 |
| CN | 112002217 A | | 11/2020 |
| CN | 214588845 U | * | 11/2021 |
| CN | 215576034 U | * | 1/2022 |
| CN | 215576034 U | | 1/2022 |
| CN | 114265240 A | | 4/2022 |
| JP | 2012109070 A | | 6/2012 |

OTHER PUBLICATIONS

Chinese First Office Action, Chinese Application No. 202210489725. 6, dated Jun. 13, 2023 (16 pages).

* cited by examiner

*Primary Examiner* — Gerald J Sufleta, II (57) ABSTRACT

A backlight module includes a plurality of light boards spliced with each other. A splicing seam is defined between adjacent light boards. Each of the light boards includes a top surface including a first surface and a second surface connected to the first surface and disposed on a side of the first surface close to the splicing seam. A plurality of columns of first light-emitting elements are disposed on the first surface. A plurality of second light-emitting elements are disposed on the second surface. At least two columns of the plurality of second light-emitting elements are disposed on the second surface along a direction close to the splicing seam. The first light-emitting elements per column or the second light-emitting elements per column are arranged along an extending direction of the splicing seam. Central light-emitting directions of the second light-emitting elements incline in a direction towards the splicing seam.

20 Claims, 5 Drawing Sheets

BACKLIGHT MODULE AND DISPLAY DEVICE

CROSS REFERENCE TO RELATED APPLICATIONS

The present disclosure claims priority of Chinese Patent Application No. 202210489725.6, filed on May 6, 2022 in China National Intellectual Property Administration, the entire contents of which are hereby incorporated by reference in their entireties.

TECHNICAL FIELD

The present disclosure relates to the field of displaying, and in particular to a backlight module and a display device.

BACKGROUND

Light Emitting Diode (LED) light boards, especially submillimeter light emitting diode (Mini LED) light boards, are the mainstream light source modes in the display industry.

Currently, since a light board of a Mini LED backlight module is limited by some factors, such as a processing technology, a yield rate, deformation, etc., a size of the light board cannot be made too large. Therefore, most of large-size display screens are formed by splicing a plurality of light boards, and a splicing seam is formed between adjacent light boards. In this way, dark light may be present at a position of the splicing seam, which appears as dark shadows or dark lines in aspect of optics for a product, thereby seriously affecting a light emitting quality of a backlight module.

In the related art, in order to reduce the dark shadows or dark lines, a chamfer is arranged on an edge of the light board, and a light-emitting element is arranged on the chamfer. However, a light emission angle of the light-emitting element disposed on the chamfer is greatly different from that of a light-emitting element disposed on a top surface, resulting in unevenness of entire light emission at the splicing seam of the light board.

SUMMARY OF THE DISCLOSURE

According to a first aspect of the present disclosure a backlight module is provided and includes: a light emitting surface; a plurality of light boards spliced with each other, a splicing seam is defined between adjacent light boards, each of the plurality of light boards includes a top surface disposed at one side close to the light emitting surface, the top surface of each of the plurality of light boards includes a first surface and a second surface connected to the first surface, and the second surface is disposed on a side of the first surface close to the splicing seam; a plurality of columns of first light-emitting elements, disposed on the first surface, the first light-emitting elements per column are arranged along an extending direction of the splicing seam; a plurality of second light-emitting elements, disposed on the second surface. at least two columns of the plurality of second light-emitting elements are disposed on the second surface along a direction close to the splicing seam, the second light-emitting elements per column are arranged along the extending direction of the splicing seam, and central light-emitting directions of the second light-emitting elements incline in a direction towards the splicing seam.

According to a second aspect of the present disclosure, a display device is provided and includes: a display panel, configured to display an image; and the above-mentioned backlight module, configured to provide a backlight source to the display panel. the display panel is correspondingly disposed on a side close to a light emitting surface of the backlight module.

According to a third aspect of the present disclosure, a backlight module is provided and includes: a back plate; an optical film, spaced apart from the back plate; and a plurality of light boards, spliced with each other and disposed between the back plate and the optical film, a splicing seam is defined between adjacent light boards. Each of the plurality of light boards comprises a first surface and a second surface, and the first surface and the second surface are connected to each other and disposed close to the optical film. A plurality of columns of first light-emitting elements are disposed on the first surface, and the first light-emitting elements per column are arranged along an extending direction of the splicing seam. The second surface is disposed a side of the first surface close to the splicing seam and inclines towards the splicing seam relative to the first surface. At least two columns of second light-emitting elements are disposed on the second surface, and the second light-emitting elements per column are arranged along the extending direction of the splicing seam.

REFERENCE NUMERALS

10—backlight module, 11—back plate, 12—light board, 13—optical film, 20—sealant, 30—foam, 40—display panel, 121—first surface, 122—second surface, 123—splicing seam, 1211—first light-emitting element, 1222—second light-emitting element, 1223—recess, 1224—protrusion, 131—light emitting surface.

DETAILED DESCRIPTION

Technical solutions in the embodiments of the present disclosure will be clearly and completely described below by referring to the accompanying drawings in the embodiments of the present disclosure. Obviously, the described embodiments are only some of but not all of the embodiments of the present disclosure. Based on the embodiments in the present disclosure, all other embodiments obtained by any ordinary skilled person in the art without making creative work shall fall within the scope of the present disclosure.

Terms "first", "second" and "third" herein are used for descriptive purposes only and shall not be interpreted as indicating or implying relative importance or implicitly specifying the number of indicated technical features. Therefore, a feature defined by the "first", "second", or "third" may explicitly or implicitly include at least one such feature. In the description of the present disclosure, "a plurality of" means at least two, such as two, three, and so on, unless otherwise expressly and specifically limited. All directional indications in the present disclosure (such as up, down, left, right, front, rear, . . . ) are used only to explain relative position relationship, movement, and the like, between components at a particular posture (as shown in the drawings). When the posture is changed, the directional indications may change accordingly. In addition, terms "include", "comprise", "have", and any variations thereof are intended to cover non-exclusive inclusion. For example, a process, a method, a system, a product or an apparatus including a series of operations or units is not limited to the listed operations or units, but may further include operations or units that are not listed, or include other operations or units that are inherent to the process, the method, the product or the apparatus.

The "embodiments" of the present disclosure may mean that a particular feature, structure, or characteristic described in an embodiment may be included in at least one embodiment of the present disclosure. Presence of the phrase at various sections in the specification does not necessarily mean a same embodiment, nor is it a separate embodiment or an alternative embodiment that is mutually exclusive with other embodiments. Any ordinary skilled person in the art shall explicitly or implicitly understand that the embodiments described herein may be combined with other embodiments.

The present disclosure will be described in details by referring to the accompanying drawings and embodiments in the following.

Figure 1:
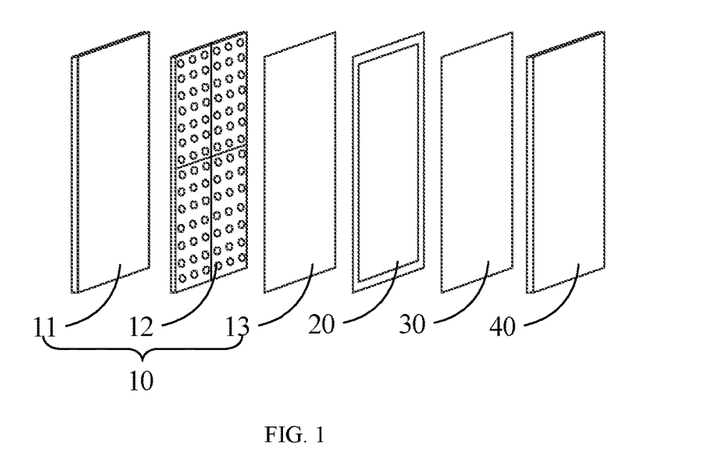
FIG. 1 is an exploded structural schematic view of a display device according to some embodiments of the present disclosure.
Figure 2:
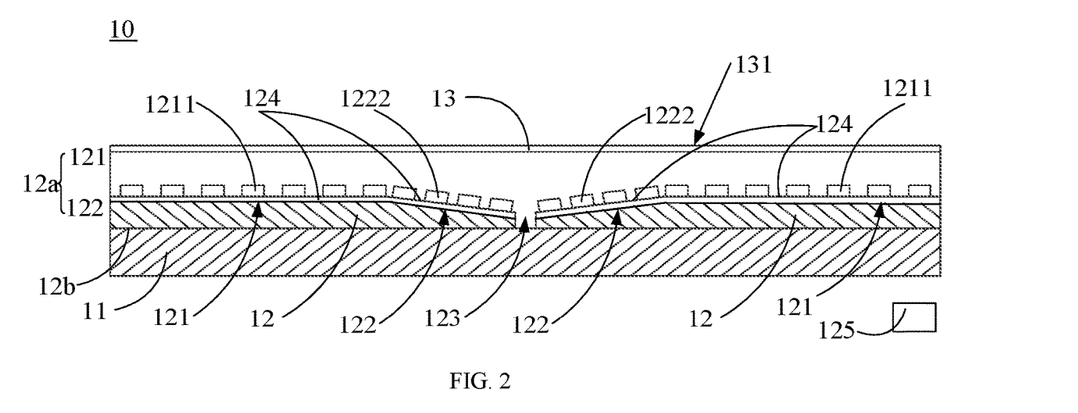
FIG. 2 is a cross-sectional structural schematic view of a backlight module according to some embodiments of the present disclosure.

As shown in FIG. 1, FIG. 1 is an exploded structural schematic view of a display device according to some embodiments of the present disclosure. A display device is provided by some embodiments of the present disclosure. The display device includes a display panel 40 and a backlight module 10. The display panel 40 is arranged correspondingly to the backlight module 10. Specifically, the backlight module 10 is configured to provide a backlight source to the display panel 40. The display panel 40 is correspondingly disposed on a side close to a light emitting surface 131 (as shown in FIG. 2) of the backlight module 10, so as to receive backlight and control a transmittance of the backlight, thereby displaying images of different gray scales. The light emitting surface 131 of the backlight module 10 is a side surface of the backlight module 10 that emits the light. In some embodiments, the display panel 40 may be a liquid crystal display panel. Specifically, the display panel 40 may include an array substrate, a color film substrate, and a liquid crystal layer disposed between the array substrate and the color film substrate.

In some embodiments, the backlight module 10 includes a back plate 11, a light board assembly (not shown), and an optical film 13. The light board assembly includes a splicing light board formed by a plurality of light boards 12 spliced with each other, and light-emitting elements disposed on the plurality of light boards 12. Specifically, the light-emitting elements are distributed on the light boards 12 in array. The display device further includes a sealant 20 and a foam 30. Specifically, the back plate 11, the splicing light board, the optical film 13, the foam 30, and the display panel 40 are stacked in sequence. The sealant 20 is arranged around edges of the display panel 40, the foam 30, the optical film 13, and the splicing light board.

As shown in FIG. 2, FIG. 2 is a cross-sectional structural schematic view of a backlight module according to some embodiments of the present disclosure. The backlight module 10 provided by some embodiments of the present disclosure includes the back plate 11, the splicing light board, and the optical film 13. Specifically, the splicing light board is formed by the plurality of light boards 12 spliced with each other. That is, the plurality of light boards 12 are spliced with each other to form the splicing light board, and a splicing seam 123 is defined between every two adjacent light boards 12. Each of the plurality of light boards 12 has a top surface 12a and a bottom surface 12b opposite to the top surface 12a. The plurality of light boards 12 are disposed on the back plate 11. The back plate 11 is disposed on a side where the bottom surface of the light board 12 is located, and the optical film 13 is arranged on a side where the top surface 12a of the light board 12 is located and spaced apart from the top surface 12a of the light board 12. As shown in FIG. 2, the side where the top surface 12a of the light board 12 is located may be a side away from the back plate 11. In some embodiments, the top surface 12a may be a surface disposed at one side close to the light emitting surface 131. That is, the plurality of light boards 12 spliced with each other are located between the back plate 11 and the optical film 13. The back plate 11 may be made of a metal material or an organic polymer material, such as aluminum alloy, plastic, or the like. The optical film 13 may include a diffuser, a brightness enhancement film, etc., but it is not limited thereto. The diffuser is configured to scatter the light emitted from the plurality of light boards 12.

The top surface 12a of the light board 12 is arranged with a reflective layer 124. The reflective layer 124 is configured to reflect the light incident on the top surface 12a of the light board 12 to the optical film 13, thereby improving a light utilization rate and the uniformity of an entire optical field corresponding to the light board 12. The splicing light board is formed by splicing the plurality of light boards 12 with each other, and the splicing seam 123 is defined between the adjacent light boards 12. In this case, the light cannot be reflected at a position of the splicing seam 123, and the light source at the position of the splicing seam 123 is missing, such that the light at the position of the splicing seam 123 is dark, thereby seriously affecting the light emitting quality of the backlight module 10. Therefore, dark shadows or dark lines will be presented at the display panel 40, which seriously affects the image display effect of the display device. In the backlight module 10 provided in some embodiments of the present disclosure, it is not necessary to add additional elements or structures to compensate the light at the splicing seam 123, such that a width of the splicing seam 123 is not increased, and it is not necessary to improve structures of other components of the backlight module 10 via arranging additional elements or structures. In addition, it is also possible to improve the balance of the entire optical field of the backlight module 10.

Figure 3:
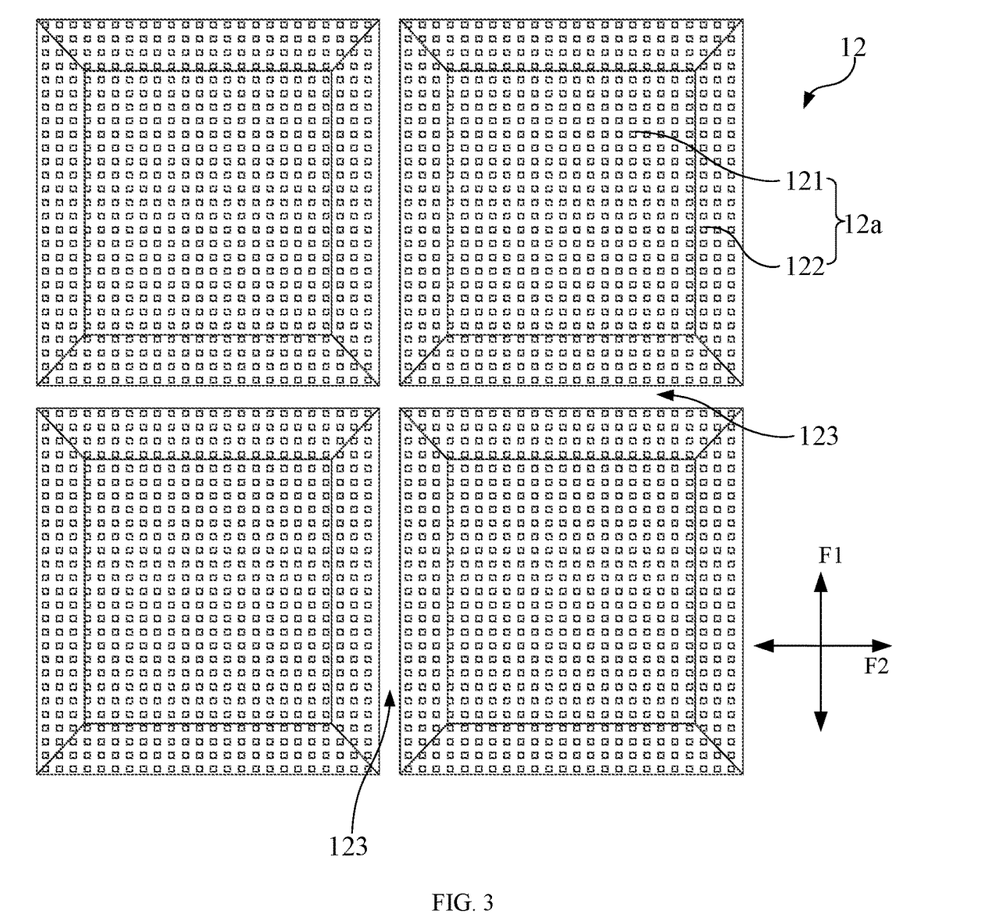
FIG. 3 is a top structural schematic view of a light board of the backlight module according to a first embodiment of the present disclosure.
Figure 4:
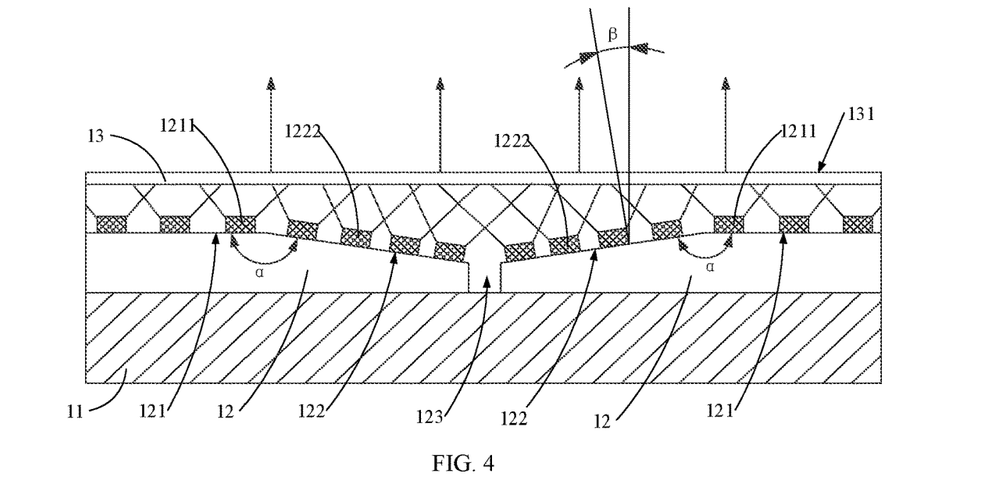
FIG. 4 is a partial cross-sectional schematic view of the backlight module as shown in FIG. 3.

As shown in FIGS. 3-4, FIG. 3 is a top structural schematic view of a light board of the backlight module according to a first embodiment of the present disclosure, and FIG. 4 is a partial cross-sectional schematic view of the backlight module as shown in FIG. 3. In some embodiments, the backlight module 10 includes the plurality of light boards 12 spliced with each other. The splicing seam 123 is defined between the adjacent light boards 12. The top surface 12a of each of the plurality of light boards 12 includes a first surface 121 and a second surface 122 connected to the first surface 121. The first surface 121 is substantially parallel to the bottom surface 12b of the light board 12. The first surface 121 is arranged with a plurality of columns of first light-emitting elements 1211. The first light-emitting elements 1211 per column are arranged along an extending direction of the splicing seam 123. As shown in FIG. 3, the extending direction of the splicing seam 123 may be a first direction F1. Alternatively, the extending direction of the splicing seam 123 may be a second direction F2 substantially perpendicular to the first direction F1. In some embodiments, the first direction F1 may a width direction or a length direction of each of the plurality of light boards 12. Specifically, the plurality of first light-emitting elements 1211 may be evenly distributed on the first surface 121, thereby improving the uniformity of the light source of the first light-emitting elements 1211 on the first surface 121. A distance between two adjacent first light-emitting elements 1211 in a same column is L. A distance between the corresponding first light-emitting elements 1211 in two adjacent columns is also L. The corresponding first light-emitting elements 1211 in two adjacent columns are two adjacent first light-emitting elements 1211 in a same row and different columns. A specific value of the distance L between the two adjacent first light-emitting elements 1211 or the corresponding first light-emitting elements 1211 in the two adjacent columns may be specifically set according to some factors, such as light intensities of the first light-emitting elements 1211, the light intensities required at various optical fields of the backlight module 10, or the like, which is not limited herein. In some embodiments, the first light-emitting element 1211 may be a LED, or other light-emitting elements, such as a Mini LED, a Micro LED, or the like. A size of the Mini LED is in a range from about 50 μm to about 200 μm, and a size of the Micro LED is less than 50 μm. In some embodiments, the first light-emitting element 1211 is the Mini LED.

The second surface 122 is connected to the first surface 121. In addition, the second surface 122 is disposed on a side of the first surface 121 close to the splicing seam 123. The second surface 122 is arranged with second light-emitting elements 1222. Specifically, at least two columns of the plurality of second light-emitting elements 1222 are disposed on the second surface 122 along a direction close to the splicing seam 123. The second light-emitting elements 1222 per column are arranged along the extending direction of the splicing seam 123. Similarly, the extending direction of the splicing seam 123 may be also the first direction F1 as shown in FIG. 3. Alternatively, the extending direction of the splicing seam 123 may also be a second direction F2 substantially perpendicular to the first direction F1 as shown in FIG. 3. In some embodiments, the second light-emitting elements 1222 per column may be evenly distributed along the extending direction of the splicing seam 123. That is, a distance between two adjacent second light-emitting elements 1222 in the same column keeps constant or unchanged, and the distance between two adjacent second light-emitting elements 1222 in the same column may be the same as that between the two adjacent first light-emitting elements 1211 in the same column. In this way, it is possible to improve the uniformity of the light source of the first light-emitting elements 1211 and the second light-emitting elements 1222 on the top surface 12a of the light board 12 along the extending direction of the splicing seam 123, thereby improving the balance of distribution of the optical fields in this direction. A plurality of columns of second light-emitting elements 1222 may be evenly distributed on the second surface 122 along a direction close to or approaching the splicing seam 123, or may be unevenly distributed on the second surface 122, and a specific setting method may be found in the following description. Similar to the first light-emitting elements 1211, the second light-emitting elements 1222 may be the LED, such as the Mini LED, the Micro LED, or the like. A type of each of the first light-emitting elements 1211 may be the same as or different from that of each of the second light-emitting elements 1222, the types of the first light-emitting elements 1211 and the types of the second light-emitting elements 1222 may be set according to specific requirements, which is not limited herein. Generally, in order to facilitate production and preparation and reduce manufacturing processes, the types of the second light-emitting elements 1222 may be generally set to be the same as the types of the first light-emitting elements 1211. In some embodiments, the second light-emitting elements 1222 and the first light-emitting elements 1211 are Mini LEDs.

Specifically, central light-emitting directions of the second light-emitting elements 1222 incline in a direction towards the splicing seam 123 or incline towards the splicing seam 123, such that part of the emission light of the plurality of second light-emitting elements 1222 disposed on the second surface 122 close to the splicing seam 123 converges on an upper position of the splicing seam 123, so as to compensate light at the position of the splicing seam 123. In addition, on two sides of the splicing seam 123, the light is compensated at the position of the splicing seam 123 via the plurality of second light-emitting elements 1222 disposed on the second surface 122 of the top surface 12a of two adjacent light boards 12 close to the splicing seam 123, thereby improving the effect of compensating light. Furthermore, at least two columns of the plurality of second light-emitting elements 1222 are disposed on the second surface 122 along the direction close to the splicing seam 123, such that the second light-emitting elements 1222 in a first column close to the splicing seam 123 may compensate the light at the position of the splicing seam 123, and the second light-emitting elements 1222 in a second column away from the splicing seam 123 may sequentially compensate light at the positions of the second light-emitting elements 1222 in an adjacent column (that is, a third column or the first column) located at a side of the second column close to the splicing seam 123. In this case, it is possible to reduce the situation that the optical field at the positions of the second light-emitting elements 1222 in the adjacent column (that is, the third column or the first column) may become dark due to the case that light-emitting centers of the second light-emitting elements 1222 in the adjacent column (that is, the third column or the first column) are shifted or offset or deviated towards the direction close to the splicing seam 123, and thus, it is possible to further improve the balance of the optical field of the light board 12 along a direction substantially perpendicular to the extending direction of the splicing seam 123, thereby further improving the balance of the entire optical field of the backlight module 10 and effectively improving the light emitting quality of the backlight module 10.

In some embodiments, the second surface 122 inclines towards the splicing seam 123 relative to the first surface 121, such that the central light-emitting directions of the second light-emitting elements 1222 incline in the direction towards the splicing seam 123 or incline towards the splicing seam 123. Specifically, the second surface 122 is an inclined surface which inclines towards the splicing seam 123 relative to the first surface 121. At least two columns of the plurality of second light-emitting elements 1222 are disposed on the inclined surface along the direction close to the splicing seam 123. In some embodiments, the direction close to the splicing seam 123 is substantially perpendicular to the extending direction of the splicing seam 123 and faces towards the splicing seam 123. An angle α between the first surface 121 and the second surface 122 is greater than 165° and less than 175°. That is, the angle α between the first surface 121 and the second surface 122 is in a range from 165° to 175°, such that an inclining degree of the central light-emitting directions of the second light-emitting elements 1222 inclining towards the direction facing towards the splicing seam 123 may be controlled by adjusting the angle α between the first surface 121 and the second surface 122, thereby controlling a degree of compensating light of the second light-emitting elements 1222 to the optical field of the splicing seam 123. Specifically, when the angle α between the first surface 121 and the second surface 122 is in the range from 165° to 175°, the less the angle α is, the greater the inclining degree of the second surface 122 inclining towards the first surface 121 is, such that the greater the inclination angles β of the central light-emitting directions of the second light-emitting elements 1222 inclining towards the direction facing towards the splicing seam 123 are, and the more the light compensated at the position of the splicing seam 123 is. In a specific application, the angle α between the first surface 121 and the second surface 122 may be set according to some factors, such as the intensity of the optical field of the splicing seam 123, a region of the dark shadows or dark lines at the position of the splicing seam 123, and so on, which is not limited herein.

In some embodiments, 4-8 columns of plurality of the second light-emitting elements 1222 are disposed on the second surface 122 along the direction close to the splicing seam 123. The inclination angles β of the central light-emitting directions of the second light-emitting elements 1222 in the plurality of columns gradually increase along the direction close to the splicing seam 123, and an inclination angle β of each of the second light-emitting elements 1222 closest to the splicing seam 123 is the maximum angle. In other words, a center of the optical field corresponding to each of the second light-emitting elements 1222 closest to the splicing seam 123 is shifted or offset or deviated more toward the splicing seam 123, such that a greater proportion of the optical fields corresponding to the second light-emitting elements 1222 closest to the splicing seam 123 are projected in an area of the optical field of the splicing seam 123, thereby ensuring the effect of compensating light on the optical field of the position of the splicing seam 123. The inclination angles β of the second light-emitting elements 1222 in other columns gradually increase along the direction close to the splicing seam 123. That is, along the direction close to the splicing seam 123, offsets or deviations of the centers of the optical fields corresponding to the second light-emitting elements 1222 towards the splicing seam 123 gradually increases in the direction close to the splicing seam 123, such that a proportion of each of the optical fields corresponding to a column (second column) of the second light-emitting elements 1222 that is projected in an area of each optical field corresponding to each of the second light-emitting elements 1222 in the adjacent column (the third column or the first column) is greatly increased along the direction close to the splicing seam 123. In this case, the second light-emitting elements 1222 per column (the second column) sequentially compensate the light to the optical fields corresponding to the positions of the second light-emitting elements 1222 in the adjacent column (the third column or the first column) to corresponding degree. In this way, it is possible to reduce the situation that the optical fields of the corresponding positions of the second light-emitting elements 1222 in the adjacent column (the third column or the first column) may gradually become dark due to the case that the light-emitting centers of the second light-emitting elements 1222 in the adjacent column (the third column or the first column) are gradually shifted or offset or deviated towards the direction close to the splicing seam 123. In other words, in case that the second light-emitting elements 1222 are disposed closer to the splicing seam 123, an inclination angle β of the light-emitting center of each of the second light-emitting element 1222 closer to the splicing seam 123 is greater, the deviation or offset of the center of the optical field corresponding to each of the second light-emitting element 1222 is greater, and the situation that the corresponding optical fields at the position of the second light-emitting elements 1222 become darker is more obvious. In this way, a second light-emitting element 1222 in the second column compensates more light on the optical field corresponding to the position of another second light-emitting element 1222 disposed in an adjacent column (that is, the third column or the first column) located at one side of the second column close to the splicing seam 123. That is, the light is contrapuntally compensated on the optical fields corresponding to the positions of the second light-emitting elements 1222 per column. Therefore, it is possible to further improve the balance of the optical field distribution corresponding to the second surface 122, thereby further improving the balance of the entire optical field distribution of the light board 12 and effectively improving the light emitting quality of the backlight module 10.

It is easy to understand that the 4-8 columns of the plurality of second light-emitting elements 1222 are disposed on the second surface 122 along the direction close to the splicing seam 123, such that the light may be not only compensated on the optical field corresponding to the position of the splicing seam 123, but also contrapuntally compensated on the optical fields corresponding to the positions of the second light-emitting elements 1222 per column disposed on the second surface 122. At the same time, it is also possible to reduce redundancy caused by too many second light-emitting elements 1222 in the area of the second surface 122 away from the splicing seam 123, such that the number of the second light-emitting elements 1222 disposed on the second surface 122 may be just enough to meet requirements of compensating light on the optical field at the position of the splicing seam 123 and the optical fields corresponding to the positions of the second light-emitting elements 1222 close to the splicing seam 123 without any redundancy, thereby simplifying structure of the light board 12. The specific number of the second light-emitting elements 1222 may be set according to specific requirements, which is not limited herein.

Figure 5:
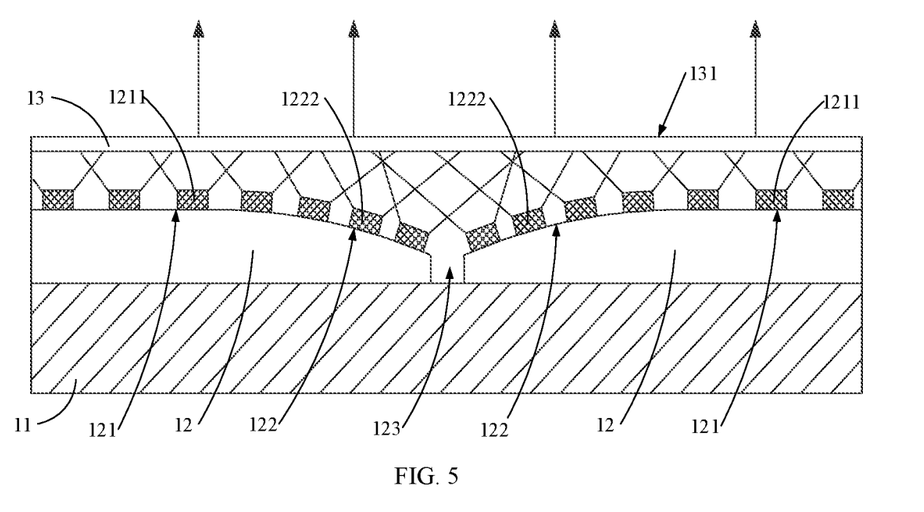
FIG. 5 is a partial cross-sectional schematic view of the backlight module according to a second embodiment of the present disclosure.

As shown in FIG. 5, FIG. 5 is a partial cross-sectional schematic view of the backlight module according to a second embodiment of the present disclosure. In some embodiments, the angle α between the first surface 121 and the second surface 122 decreases gradually along the direction towards the splicing seam 123, such that the central light-emitting directions of the second light-emitting elements 1222 gradually incline in the direction towards the splicing seam 123 or incline towards the splicing seam 123 along the direction close to the splicing seam 123. Specifically, the second surface 122 inclines towards the splicing seam 123 relative to the first surface 121, and the second surface 122 is an arc-shaped surface protruding towards the optical film 13. It may be also understood that the second surface 122 is the arc-shaped surface protruding towards the light emitting surface 131 of the backlight module 10, such that an angle between each of cut surfaces at various positions of the arc-shaped surface along the direction close to the splicing seam 123 and the first surface 121 gradually decreases. It should be noted that the angle between the each cut surface at various positions of the arc-shaped surface and the first surface 121 is the angle α between the first surface 121 and the second surface 122.

In some embodiments, the second surface 122 is the arc-shaped surface protruding towards the optical film 13, such that the angle between the each cut surface at various positions of the arc-shaped surface along the direction close to the splicing seam 123 and the first surface 121 gradually decreases. That is, the angle α between the first surface 121 and the second surface 122 gradually decreases along the direction towards the splicing seam 123, such that the central light-emitting directions of the second light-emitting elements 1222 gradually incline towards the splicing seam 123 along the direction close to the splicing seam 123. That is, the inclination angles β of the central light-emitting directions of the second light-emitting elements 1222 in the plurality of columns gradually increase along the direction close to the splicing seam 123, such that an increasing or greater proportion of the optical fields corresponding to the second light-emitting elements 1222 close to the splicing seam 123 is projected in an area of the optical field of the splicing seam 123, thereby ensuring the effect of compensating light on the optical field at the position of the splicing seam 123. The inclination angles β of the second light-emitting elements 1222 in other columns gradually increase along the direction close to the splicing seam 123. That is, along the direction close to the splicing seam 123, offsets or deviations of the centers of the optical fields corresponding to the second light-emitting elements 1222 towards the splicing seam 123 gradually increases in the direction close to the splicing seam 123, such that along the direction close to the splicing seam 123, the second light-emitting elements 1222 per column (the second column) sequentially compensate the light to the optical fields corresponding to the positions of the second light-emitting elements 1222 in the adjacent column (that is, the third column or the first column) to corresponding degree. In this way, it is possible to reduce the situation that the optical fields of the corresponding positions of the second light-emitting elements 1222 in the adjacent column (that is, the third column or the first column) may gradually become dark due to the case that the light-emitting centers of the second light-emitting elements 1222 in the adjacent column (that is, the third column or the first column) are gradually shifted or offset or deviated towards the direction close to the splicing seam 123. Therefore, it is possible to further improve the balance of the optical field distribution corresponding to the second surface 122, thereby further improving the balance of the entire optical field distribution of the light board 12 and effectively improving the light emitting quality of the backlight module 10.

Figure 6:
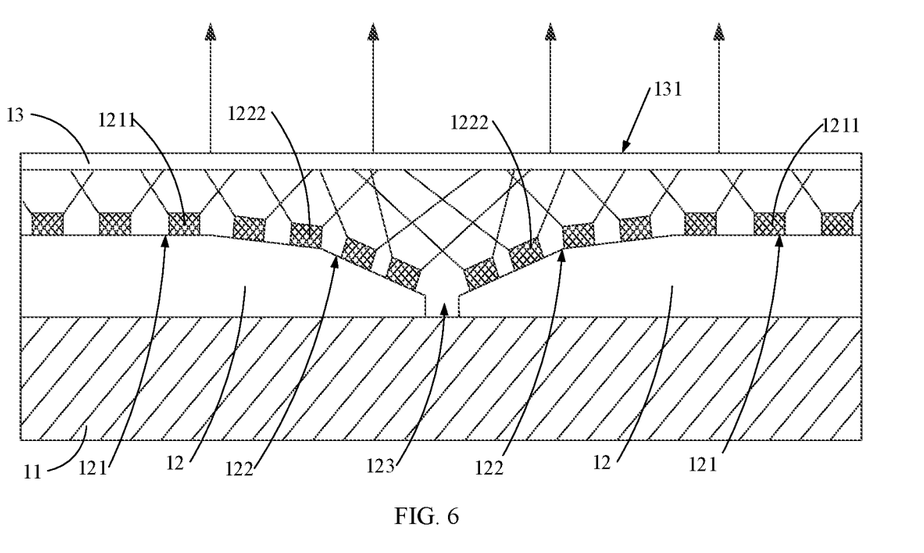
FIG. 6 is a partial cross-sectional schematic view of the backlight module according to a third embodiment of the present disclosure.

As shown in FIG. 6, FIG. 6 is a partial cross-sectional schematic view of the backlight module according to a third embodiment of the present disclosure. Different from the above-mentioned embodiments, the second surface 122 provided in this embodiment is a zigzag surface protruding towards the optical film 13. For example, the zigzag surface may be a part of surfaces of a polygonal prism, such that the angle α between the first surface 121 and the second surface 122 gradually decreases along the direction close to the splicing seam 123, and thus the central light-emitting directions of the second light-emitting elements 1222 gradually incline in the direction towards the splicing seam 123 or incline towards the splicing seam 123 along the direction close to the splicing seam 123. In this embodiment, the angle α between the first surface 121 and the second surface 122 is an angle between the first surface 121 and each of surfaces of the polygon along the direction towards the splicing seam 123. The angles gradually decrease along the direction towards the splicing seam 123, such that the central light-emitting directions of the second light-emitting elements 1222 gradually incline in the direction towards the splicing seam 123 or incline towards the splicing seam 123 along the direction close to the splicing seam 123. Specifically, a specific structure and function of the second surface 122 of the light board 12 in the third embodiment is the same as or similar to those of the second surface 122 of the light board 12 in the second embodiment, which can be found in the relevant description above, and will not be repeated herein.

Figure 7:
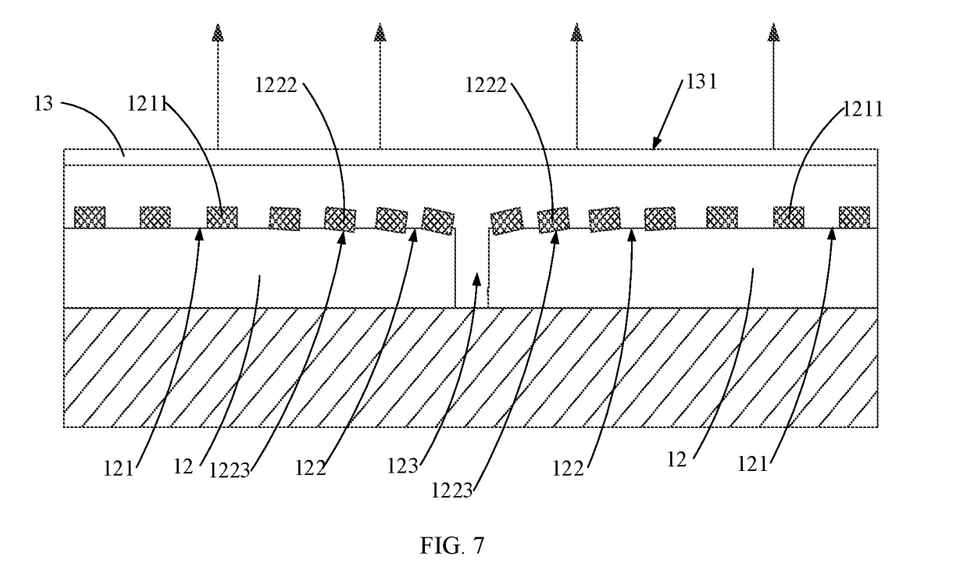
FIG. 7 is a partial cross-sectional schematic view of the backlight module according to a fourth embodiment of the present disclosure.
Figure 8:
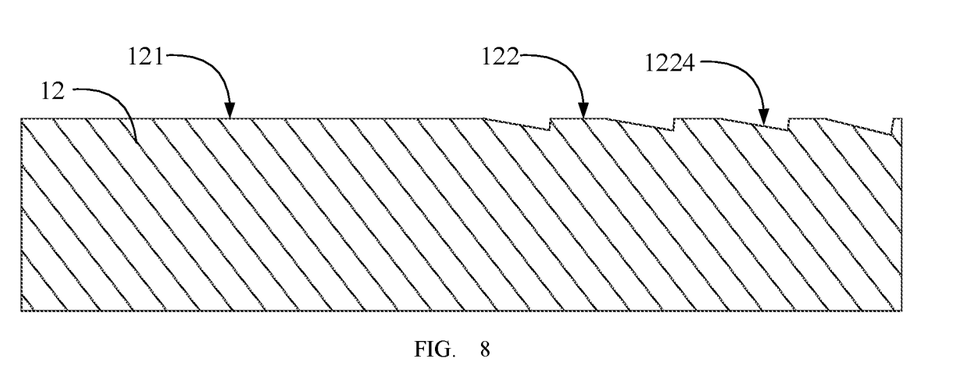
FIG. 8 is a structural schematic view of a light board as shown in FIG. 7.
Figure 9:
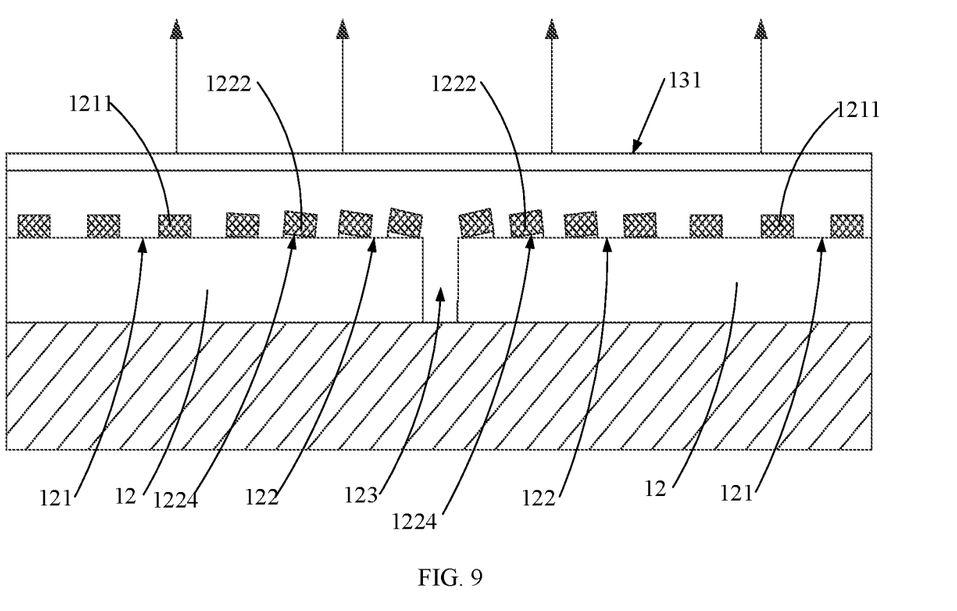
FIG. 9 is a partial cross-sectional schematic view of the backlight module according to a fifth embodiment of the present disclosure.

As shown in FIG. 7 and FIG. 8, FIG. 7 is a partial cross-sectional schematic view of the backlight module according to a fourth embodiment of the present disclosure, and FIG. 8 is a structural schematic view of a light board as shown in FIG. 7. In this embodiment, the first surface 121 and the second surface 122 are disposed on the same plane. In other words, the first surface 121 and the second surface 122 are the same plane connected with each other, and the same plane is substantially parallel to the bottom surface 12b of the light board 12, that is, the first surface 121 and the second surface 122 are substantially parallel to the bottom surface 12b of the light board 12. Specifically, the second surface 122 defines a plurality of recesses 1223, and the plurality of recesses 1223 are arranged at intervals along the direction close to the splicing seam 123. Each of the plurality of recesses 1223 has an inclined surface facing towards the splicing seam 123 relative to the first surface 121. In addition, the inclined surfaces of the plurality of recesses 1223 gradually incline towards the splicing seam 123 along the direction close to the splicing seam 123. Each second light-emitting element 1222 is disposed on the corresponding inclined surface, such that the central light-emitting directions of the second light-emitting elements 1222 incline in the direction towards the splicing seam 123 or incline towards the splicing seam 123.

The second surface 122 defines the plurality of recesses 1223, and the plurality of recesses 1223 are arranged at intervals along the direction close to the splicing seam 123. The plurality of recesses 1223 may be distributed on the second surface 122 in array. One second light-emitting element 1222 may be disposed on the inclined surface of each of the plurality of recesses 1223. Alternatively, the plurality of recesses 1223 are arranged in a plurality of columns along the direction close to the splicing seam 123. The recesses 1223 per column are in a strip shape along the extending direction of the splicing seam 123. The inclined surfaces of the recesses 1223 per column are correspondingly arranged with the plurality of second light-emitting elements 1222 spaced apart from each other. The plurality of second light-emitting elements 1222 disposed in the recesses 1223 per column are referred as one column of the second light-emitting elements 1222, such that the second light-emitting elements 1222 are arranged in the plurality of columns along the direction close to the splicing seam 123, and the second light-emitting elements 1222 per column are arranged along the extending direction of the splicing seam 123. In some embodiments, a depth of each of the recess 1223 is less than or equal to a height of each of the second light-emitting elements 1222, thereby reducing the situation that the optical field corresponding to the position of each of the second light-emitting elements 1222 in the corresponding recess 1223 becomes dark since a sidewall of each of the recess 1223 shades or blocks the emission light of the second light-emitting element 1222 disposed in the corresponding recess 1223. A specific size of each of the recesses 1223 may be set according to specific requirements, which is not limited herein.

In this embodiment, the plurality of recesses 1223 are defined on the second surface 122 and spaced apart from each other along the direction close to the splicing seam 123, the each of the plurality of recesses 1223 has the inclined surface towards the splicing seam 123 relative to the first surface 121, and the second light-emitting element 1222 may be disposed on the inclined surface of each of the plurality of recesses 1223, such that the central light-emitting directions of the second light-emitting elements 1222 incline in the direction towards the splicing seam 123 or incline towards the splicing seam 123, thereby compensating the light on the optical fields of the splicing seam 123. In addition, along the direction close to the splicing seam 123, the second light-emitting elements 1222 per column (the second column) may sequentially compensate the light on the optical fields corresponding to the positions of the second light-emitting elements 1222 in the adjacent column (that is, the third column or the first column), such that it is possible to reduce the situation that the optical fields of the corresponding positions of the second light-emitting elements 1222 in the adjacent column (that is, the third column or the first column) may gradually become dark due to the case that light-emitting centers of the second light-emitting elements 1222 in the adjacent column (that is, the third column or the first column) are gradually shifted or offset or deviated towards the direction close to the splicing seam 123. Therefore, it is possible to further improve the balance of the optical field distribution corresponding to the light board 12, thereby further improving the balance of the entire optical field distribution of the backlight module 10 and effectively improving the light emitting quality of the backlight module 10. Furthermore, the inclined surfaces of the plurality of recesses 1223 gradually incline towards the splicing seam 123, such that the inclination angles β of the second light-emitting elements 1222 gradually increase along the direction close to the splicing seam 123, and thus along the direction close to the splicing seam 123, the second light-emitting elements 1222 per column (the second column) sequentially compensate the light to the optical fields corresponding to the positions of the second light-emitting elements 1222 in the adjacent column (that is, the third column or the first column) to corresponding degree. In this case, it is possible to reduce the situation that the optical fields of the corresponding positions of the second light-emitting elements 1222 in the adjacent column (that is, the third column or the first column) may gradually become dark due to the case that light-emitting centers of the second light-emitting elements 1222 in the adjacent column (that is, the third column or the first column) are gradually shifted or offset towards the direction close to the splicing seam 123. Therefore, it is possible to further improve the balance of the optical field distribution corresponding to the second surface 122, thereby further improving the balance of the entire optical field distribution of the light board 12 and effectively improving the light emitting quality of the backlight module 10.

As shown in FIG. 8, FIG. 8 is a partial cross-sectional schematic view of the backlight module according to a fifth embodiment of the present disclosure. Different from the fourth embodiment as described above, the second surface 122 provided in this embodiment has a plurality of protrusions 1224 arranged thereon, and the plurality of protrusions 1224 are arranged at intervals along the direction close to the splicing seam 123. Each of the plurality of protrusions 1224 has an inclined surface facing towards the splicing seam 123 relative to the first surface 121. In addition, the inclined surface of each of the plurality of protrusions 1224 gradually inclines towards the splicing seam 123 along the direction close to the splicing seam 123. The second light-emitting element 1222 is disposed on the inclined surface of each of the plurality of protrusions 1224, such that the central light-emitting directions of the second light-emitting elements 1222 incline in the direction towards the splicing seam 123 or incline towards the splicing seam 123. Specifically, the arranging ways of the protrusions 1224 are the same as or similar to those of recesses 1223 as described in the fourth embodiment, which can be found in the relevant description above, and will not be repeated here.

As shown in FIG. 7 and FIG. 8, in the fourth and fifth embodiments, the first surface 121 and the second surface 122 are disposed on the same plane, such that a distance from each second light-emitting element 1222 to the optical film 13 is substantially equal to a distance from each first light-emitting element 1211 to the optical film 13. Compared with other embodiments, in this embodiment, it is possible to further reduce the problem of weakening the intensities of the optical fields corresponding to the second light-emitting elements 1222 caused by an attenuation of the energy of the light emitted from the second light-emitting elements 1222 due to the increase in the distance from the second light-emitting element 1222 to the optical film 13. That is, it is possible to reduce the problem that brightness and darkness of the optical field corresponding to different positions of the light board 12 are different from each other due to uneven distribution of the intensities of the optical fields, thereby improving the balance of the optical field distribution of the light board 12 and effectively improving the light emitting quality of the backlight module 10.

In some embodiments, as shown in FIGS. 3-8, a distance between the corresponding second light-emitting elements 1222 in the two adjacent columns is smaller than a corresponding distance between the first light-emitting elements 1211 in the two adjacent columns. The distance between the corresponding second light-emitting elements 1222 in the two adjacent columns gradually decreases along the direction close to the splicing seam 123. For example, if the third column is disposed between the first column and the second column, a distance between the second light-emitting elements 1222 in the second column and the corresponding second light-emitting elements 1222 in the third column is smaller than a distance between the second light-emitting elements 1222 in the third column and the corresponding second light-emitting elements 1222 in the first column. Specifically, the distance between the corresponding first light-emitting elements 1211 in the two adjacent columns and the distance between the corresponding second light-emitting elements 1222 in the two adjacent columns may be set according to some factors, such as the intensity of the emitting light corresponding to the first light-emitting elements 1211 and the second light-emitting elements 1222, the required intensity of the optical field of the backlight module 10, or the like, which is not limited herein. Herein, "the corresponding second light-emitting elements 1222 in the two adjacent columns" refers to the second light-emitting elements 1222 in the same row but two different adjacent columns.

In the backlight module 10, the distance between the corresponding second light-emitting elements 1222 in the two adjacent columns is smaller than the corresponding distance between the first light-emitting elements 1211 in the two adjacent columns, such that the second light-emitting elements 1222 are more concentrated than the first light-emitting elements 1211. Therefore, the second light-emitting elements 1222 in the plurality of columns may compensate the optical fields corresponding to the positions of the second light-emitting element 1222 in the adjacent column (that is, the third column or the first column) along the direction close to the splicing line 123, and it is also possible to ensure that there is a smaller central deviation in the corresponding optical fields at the positions of the second light-emitting elements 1222 in the plurality of columns, such that there is a smaller change in the brightness and darkness of the corresponding optical fields at the position thereof, and thus the light is compensated easily. At the same time, the inclination angles β of the second light-emitting elements 1222 gradually increase along the direction close to the splicing seam 123, that is, the central deviation of the optical fields corresponding to the positions the second light-emitting elements 1222 gradually increases. In this case, the distance between the corresponding second light-emitting elements 1222 in the two adjacent columns is set to gradually decrease along the direction close to the splicing seam 123, such that the intensity of the compensated light of the optical fields corresponding to the positions of the second light-emitting elements 1222 in the adjacent column (that is, the third column or the first column) gradually increases along the direction close to the splicing seam 123 via the plurality of the second light-emitting elements 1222. Therefore, it is possible to reduce the situation that the optical field of the corresponding positions of the second light-emitting elements 1222 in the adjacent column (that is, the third column or the first column) may gradually become dark due to the case that light-emitting centers of the second light-emitting elements 1222 in the adjacent column (that is, the third column or the first column) are gradually shifted or offset or deviated towards the direction close to the splicing seam 123, and thus, it is possible to further improve the balance of the optical field distribution corresponding to the second surface 122, thereby further improving the balance of the entire optical field distribution of the light board 12 and effectively improving the light emitting quality of the backlight module 10.

In another embodiment, the backlight module 10 further includes a controlling unit 125. The controlling unit 125 is configured to control the first light-emitting elements 1211 and the second light-emitting elements 1222, such that the light intensities of the second light-emitting elements 1222 are greater than those of the first light-emitting elements 1211. The controlling unit 125 is further configured to control the light intensities of the second light-emitting elements 1222 to gradually increase along the direction close to the splicing seam 123. Since the light-emitting directions of the second light-emitting elements 1222 incline in the direction towards the splicing seam 123 or incline towards the splicing seam 123, the light may be compensated on the optical field corresponding to the position of the splicing seam 123 or on the optical fields corresponding to the positions of the second light-emitting elements 1222 in the adjacent column (that is, the third column or the first column) close to the splicing seam 123. In this case, a central position of the optical field corresponding to the position of each of the second light-emitting elements 1222 shifts towards the splicing seam 123, and the optical field at an original central position becomes dark. In some embodiments, the light intensity of each of the second light-emitting elements 1222 is controlled to be greater than that of each of the first light-emitting elements 1211 via the controlling unit 125, such that the intensity of the optical field corresponding to each of the second light-emitting elements 1222 is greater than that of the optical field corresponding to each of the first light-emitting elements 1211, thereby compensating the optical field at the original central position that became dark. Therefore, the intensity and balance of the optical field corresponding to the second surface 122 are substantially consistent with those of the optical field corresponding to the first surface 121, thereby improving the light emitting quality of the backlight module 10. Further, the inclination angles β of the second light-emitting elements 1222 gradually increase along the direction close to the splicing seam 123, that is, the central deviations of the optical fields corresponding to the positions of the second light-emitting elements 1222 gradually increases. The controlling unit 125 is configured to control the light intensities of the plurality of second light-emitting elements 1222 to gradually increase along the direction close to the splicing seam 123, such that along the direction close to the splicing seam 123, the intensities of the compensated light of the optical fields corresponding to the positions of the second light-emitting element 1222 in the adjacent column (that is, the third column or the first column) gradually increase via the plurality of the second light-emitting elements 1222 (the second column). Therefore, it is possible to reduce the situation that the optical field of the corresponding positions of the second light-emitting elements 1222 in the adjacent column (that is, the third column or the first column) may gradually become dark due to the case that light-emitting centers of the second light-emitting elements 1222 in the adjacent column (that is, the third column or the first column) are gradually shifted or offset or deviated towards the direction close to the splicing seam 123, and thus, it is possible to further improve the balance of the optical field distribution corresponding to the second surface 122, thereby further improving the balance of the entire optical field distribution of the light board 12 and effectively improving the light emitting quality of the backlight module 10.

Figure 10:
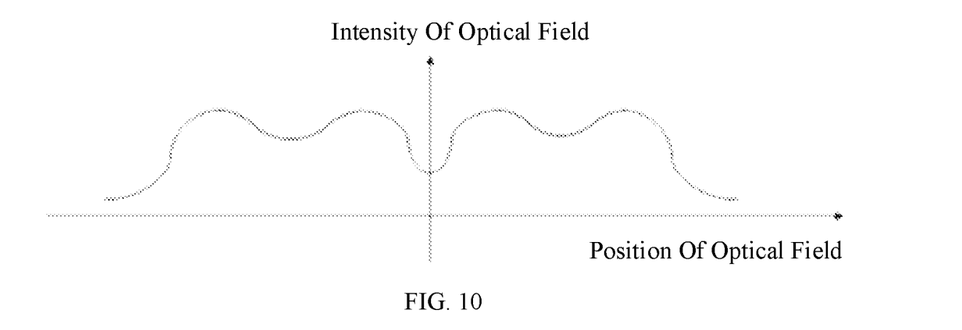
FIG. 10 is a schematic diagram of a distribution of an optical field on a surface of an optical film close to a light board of a general backlight module.
Figure 11:
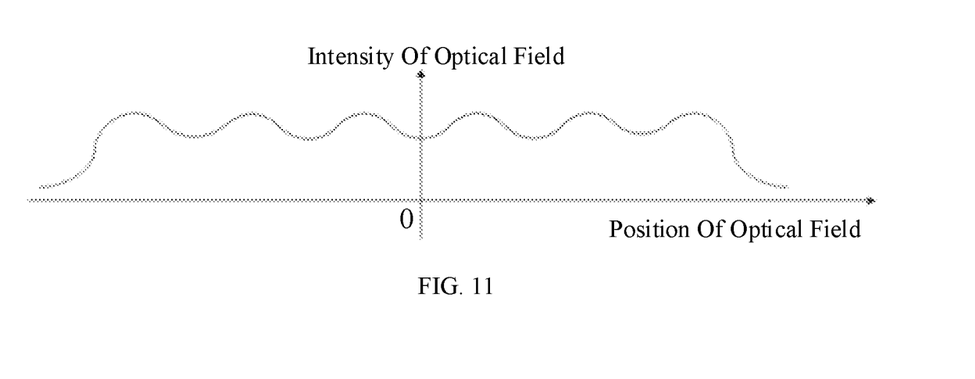
FIG. 11 is a schematic diagram of a distribution of an optical field on a surface of an optical film close to the light board of the backlight module according to some embodiments of the present disclosure.

As shown in FIG. 11 and FIG. 11, FIG. 11 is a schematic diagram of a distribution of an optical field on a surface of an optical film close to a light board of a general backlight module, and FIG. 11 is a schematic diagram of a distribution of an optical field on a surface of an optical film close to the light board of the backlight module according to some embodiments of the present disclosure. An abscissa shown in FIG. 11 and FIG. 11 indicates a position coordinate of the optical film 13 along a direction substantially perpendicular to the splicing seam 123, and the abscissa of the position of the optical film 13 corresponding to the splicing seam 123 is the abscissa of an origin. The ordinate indicates the intensity of the optical field corresponding to each position on the optical film 13. It is easy to see from FIGS. 9-10 that in the backlight module 10 provided in some embodiments of the present disclosure, the intensity of the optical field at the position corresponding to the splicing seam 123 is substantially the same as of the intensities of the optical fields at other positions of the light board 12, which indicates that the effect of compensating light on the optical field at the position of the splicing seam 123 is improved effectively via the second light-emitting elements 1222 of the backlight module 10 provided in the embodiments according to the present disclosure. At the same time, it is also easy to see that the intensities of the optical fields at various positions of the optical film 13 are substantially the same as each other, and the distribution of the entire optical fields are even, which indicates that in the backlight module 10 provided in the embodiments according to the present disclosure, the intensities of the optical fields at various positions corresponding to the light board 12 may substantially the same as each other, and the uniformity of the backlight provided by the backlight module 10 and the light emitting quality are improved effectively.

According to a first aspect of the present disclosure, a backlight module is provided and includes: a light emitting surface; a plurality of light boards spliced with each other, a splicing seam is defined between adjacent light boards, each of the plurality of light boards includes a top surface disposed at one side close to the light emitting surface, the top surface of each of the plurality of light boards includes a first surface and a second surface connected to the first surface, and the second surface is disposed on a side of the first surface close to the splicing seam; a plurality of columns of first light-emitting elements, disposed on the first surface, the first light-emitting elements per column are arranged along an extending direction of the splicing seam; a plurality of second light-emitting elements, disposed on the second surface. At least two columns of the plurality of second light-emitting elements are disposed on the second surface along a direction close to the splicing seam, the second light-emitting elements per column are arranged along the extending direction of the splicing seam, and central light-emitting directions of the second light-emitting elements incline in a direction towards the splicing seam.

In some embodiments, the plurality of second light-emitting elements are arranged in a plurality of columns, inclination angles of the central light-emitting directions of the second light-emitting elements in the plurality of columns gradually increase along the direction close to the splicing seam.

In some embodiments, 4-8 columns of the plurality of second light-emitting elements are disposed on the second surface along the direction close to the splicing seam.

In some embodiments, the second surface inclines towards the splicing seam relative to the first surface, such that the central light-emitting directions of the second light-emitting elements incline in the direction towards the splicing seam.

In some embodiments, an angle between the first surface and the second surface is greater than 165° and less than 175°.

In some embodiments, an angle between the first surface and the second surface decreases gradually along the direction towards the splicing seam, such that the central light-emitting directions of the second light-emitting elements gradually incline in the direction towards the splicing seam along the direction close to the splicing seam.

In some embodiments, the first surface and the second surface are disposed on the same plane, the second surface defines a plurality of recesses, and the plurality of recesses are arranged at intervals along the direction close to the splicing seam; each of the plurality of recesses comprises an inclined surface facing towards the splicing seam relative to the first surface, and the inclined surfaces of the plurality of recesses gradually incline in the direction towards the splicing seam along the direction close to the splicing seam; and the plurality of second light-emitting elements are disposed on the second surface, such that the central light-emitting directions of the second light-emitting elements gradually incline in the direction towards the splicing seam along the direction close to the splicing seam.

In some embodiments, the first surface and the second surface are disposed on the same plane, the second surface defines a plurality of protrusions, and the plurality of protrusions are arranged at intervals along the direction close to the splicing seam; each of the plurality of protrusions comprises an inclined surface facing towards the splicing seam relative to the first surface, and the inclined surfaces of the plurality of protrusions gradually incline in the direction towards the splicing seam along the direction close to the splicing seam; and the plurality of second light-emitting elements are disposed on the second surface, such that the central light-emitting directions of the second light-emitting elements gradually incline in the direction towards the splicing seam along the direction close to the splicing seam.

In some embodiments, a distance between the second light-emitting elements in two adjacent columns is smaller than a distance between the first light-emitting elements in two adjacent columns, and the distance between the second light-emitting elements in the two adjacent columns gradually decreases along the direction close to the splicing seam.

In some embodiments, a distance between every two adjacent second light-emitting elements in a same column keeps constant, and the distance between every two adjacent second light-emitting elements in the same column is the same as that between the two adjacent first light-emitting elements in a same column.

In some embodiments, the backlight module further comprises a controlling unit configured to control the first light-emitting elements and the second light-emitting elements, such that light intensities of the plurality of second light-emitting elements are greater than light intensities of the plurality of first light-emitting elements, and the light intensities of the second light-emitting elements gradually increase along the direction close to the splicing seam.

In some embodiments, the top surface of the light board is arranged with a reflective layer. Each of the plurality of light boards comprises a bottom surface opposite to the top surface. The backlight module further includes a back plate, disposed on a side where the bottom surface of the each of the plurality of light boards. The plurality of light boards are disposed on the back plate, and; and an optical film, disposed on a side where the top surface is located and spaced apart from the top surface.

In some embodiments, the first surface and the second surface are parallel to the bottom surface.

In some embodiments, the second surface includes an arc-shaped surface protruding towards the optical film, and an angle between the first surface and a cut surface at a position of the arc-shaped surface gradually decreases along the direction close to the splicing seam.

In some embodiments, the second surface includes a zigzag surface protruding towards the optical film, the zigzag surface comprises a plurality surfaces forming a part of a polygonal prism, and angles between the first surface and the plurality of surfaces along the direction towards the splicing seam gradually decrease along the direction close to the splicing seam.

According to a second aspect of the present disclosure, a display device is provided and includes: a display panel, configured to display an image; and the above-mentioned backlight module, configured to provide a backlight source to the display panel. The display panel is correspondingly disposed on a side close to a light emitting surface of the backlight module.

In some embodiments, the display device further includes a back plate, a foam, and an optical film. A splicing light board includes the plurality of light boards spliced with each other, and the back plate, the splicing light board, the optical film, the foam, and the display panel are stacked in sequence.

In some embodiments, the display device further includes a sealant arranged around edges of the display panel, the foam, the optical film, and the splicing light board.

In some embodiments, inclination angles of the central light-emitting directions of the second light-emitting elements in the plurality of columns gradually increase along the direction close to the splicing seam.

According to a third aspect of the present disclosure, a backlight module is provided and includes: a back plate; an optical film, spaced apart from the back plate; and a plurality of light boards, spliced with each other and disposed between the back plate and the optical film, a splicing seam is defined between adjacent light boards. Each of the plurality of light boards comprises a first surface and a second surface, and the first surface and the second surface are connected to each other and disposed close to the optical film. A plurality of columns of first light-emitting elements are disposed on the first surface, and the first light-emitting elements per column are arranged along an extending direction of the splicing seam. The second surface is disposed a side of the first surface close to the splicing seam and inclines towards the splicing seam relative to the first surface. At least two columns of second light-emitting elements are disposed on the second surface, and the second light-emitting elements per column are arranged along the extending direction of the splicing seam.

The above description shows only an implementation of the present disclosure, and does not limit the scope of the present disclosure. Any equivalent structure or equivalent process transformation performed based on the specification and the accompanying drawings of the present disclosure, directly or indirectly applied in other related technical fields, shall be equally included in the scope of the present disclosure.

What is claimed is:

1. A backlight module, comprising:
 a light emitting surface; a plurality of light boards spliced with each other, wherein a splicing seam is defined between adjacent light boards, each of the plurality of light boards comprises a top surface disposed at one side close to the light emitting surface, the top surface of each of the plurality of light boards comprises a first surface and a second surface connected to the first surface, and the second surface is disposed on a side of the first surface close to the splicing seam;
 a plurality of columns of first light-emitting elements, disposed on the first surface, wherein the first light-emitting elements per column are arranged along an extending direction of the splicing seam; and
 a plurality of second light-emitting elements, disposed on the second surface;
 wherein at least two columns of the plurality of second light-emitting elements are disposed on the second surface along a direction close to the splicing seam, the second light-emitting elements per column are arranged along the extending direction of the splicing seam, and central light-emitting directions of the second light-emitting elements incline in a direction towards the splicing seam.

2. The backlight module according to claim 1, wherein the plurality of second light-emitting elements are arranged in a plurality of columns, inclination angles of the central light-emitting directions of the second light-emitting elements in the plurality of columns gradually increase along the direction close to the splicing seam.

3. The backlight module according to claim 2, wherein 4-8 columns of the plurality of second light-emitting elements are disposed on the second surface along the direction close to the splicing seam.

4. The backlight module according to claim 1, wherein the second surface inclines towards the splicing seam relative to the first surface, such that the central light-emitting directions of the second light-emitting elements incline in the direction towards the splicing seam.

5. The backlight module according to claim 3, wherein an angle between the first surface and the second surface is greater than 165° and less than 175°.

6. The backlight module according to claim 3, wherein an angle between the first surface and the second surface decreases gradually along the direction towards the splicing seam, such that the central light-emitting directions of the second light-emitting elements gradually incline in the direction towards the splicing seam along the direction close to the splicing seam.

7. The backlight module according to claim 1, wherein the first surface and the second surface are disposed on a same plane, the second surface defines a plurality of recesses, and the plurality of recesses are arranged at intervals along the direction close to the splicing seam;
 each of the plurality of recesses comprises an inclined surface facing towards the splicing seam relative to the first surface, and the inclined surfaces of the plurality of recesses gradually incline in the direction towards the splicing seam along the direction close to the splicing seam; and
 the plurality of second light-emitting elements are disposed on the second surface, such that the central light-emitting directions of the second light-emitting elements gradually incline in the direction towards the splicing seam along the direction close to the splicing seam.

8. The backlight module according to claim 1, wherein the first surface and the second surface are disposed on a same plane, a plurality of protrusions are arranged on the second surface at intervals along the direction close to the splicing seam;
 each of the plurality of protrusions comprises an inclined surface facing towards the splicing seam relative to the first surface, and the inclined surfaces of the plurality of protrusions gradually incline in the direction towards the splicing seam along the direction close to the splicing seam; and the plurality of second light-emitting elements are disposed on the second surface, such that the central light-emitting directions of the second light-emitting elements gradually incline in the direction towards the splicing seam along the direction close to the splicing seam.

9. The backlight module according to claim 1, wherein a distance between the second light-emitting elements corresponding to each other in two adjacent columns is smaller than a distance between the first light-emitting elements corresponding to each other in two adjacent columns, and the distance between the second light-emitting elements corresponding to each other in the two adjacent columns gradually decreases along the direction close to the splicing seam.

10. The backlight module according to claim 1, wherein a distance between every two adjacent second light-emitting elements in a same column keeps constant, and the distance between every two adjacent second light-emitting elements in the same column is the same as that between the two adjacent first light-emitting elements in a same column.

11. The backlight module according to claim 1, wherein the backlight module further comprises a controlling unit configured to control the first light-emitting elements and the second light-emitting elements, such that light intensities of the plurality of second light-emitting elements are greater than light intensities of the plurality of first light-emitting elements, and the light intensities of the second light-emitting elements gradually increase along the direction close to the splicing seam.

12. The backlight module according to claim 1, wherein the top surface of the light board is arranged with a reflective layer; each of the plurality of light boards comprises a bottom surface opposite to the top surface; and the backlight module further comprises:
a back plate, disposed on a side where the bottom surface of the each of the plurality of light boards is located, wherein the plurality of light boards are disposed on the back plate; and
an optical film, disposed on a side where the top surface is located and spaced apart from the top surface.

13. The backlight module according to claim 12, wherein the first surface and the second surface are parallel to the bottom surface.

14. The backlight module according to claim 1, wherein the second surface comprises an arc-shaped surface protruding towards the optical film, and an angle between the first surface and a cut surface at a position of the arc-shaped surface gradually decreases along the direction close to the splicing seam.

15. The backlight module according to claim 1, wherein the second surface comprises a zigzag surface protruding towards the optical film, the zigzag surface comprises a plurality surfaces forming a part of a polygonal prism, and angles between the first surface and the plurality of surfaces along the direction towards the splicing seam gradually decrease along the direction close to the splicing seam.

16. A display device, comprising:
a display panel, configured to display an image; and
a backlight module, configured to provide a backlight source to the display panel;
wherein the backlight module comprises:
a light emitting surface;
a plurality of light boards spliced with each other, wherein a splicing seam is defined between adjacent light boards, each of the plurality of light boards comprises a top surface disposed at one side close to the light emitting surface, the top surface of each of the plurality of light boards comprises a first surface and a second surface connected to the first surface, and the second surface is disposed on a side of the first surface close to the splicing seam;
a plurality of columns of first light-emitting elements, disposed on the first surface, wherein the first light-emitting elements per column are arranged along an extending direction of the splicing seam; and
a plurality of second light-emitting elements, disposed on the second surface;
wherein at least two columns of the plurality of second light-emitting elements are disposed on the second surface along a direction close to the splicing seam, the second light-emitting elements per column are arranged along the extending direction of the splicing seam, and central light-emitting directions of the second light-emitting elements incline in a direction towards the splicing seam;
wherein the display panel is correspondingly disposed on a side close to a light emitting surface of the backlight module.

17. The display device according to claim 16, further comprises a back plate, a foam, and an optical film, wherein a splicing light board comprises the plurality of light boards spliced with each other, and the back plate, the splicing light board, the optical film, the foam, and the display panel are stacked in sequence.

18. The display device according to claim 17, further comprises a sealant arranged around edges of the display panel, the foam, the optical film, and the splicing light board.

19. The display device according to claim 18, wherein inclination angles of the central light-emitting directions of the second light-emitting elements in the plurality of columns gradually increase along the direction close to the splicing seam.

20. A backlight module, comprising:
a back plate;
an optical film, spaced apart from the back plate; and
a plurality of light boards, spliced with each other and disposed between the back plate and the optical film, wherein a splicing seam is defined between adjacent light boards;
wherein each of the plurality of light boards comprises a first surface and a second surface, and the first surface and the second surface are connected to each other and disposed close to the optical film;
a plurality of columns of first light-emitting elements are disposed on the first surface, and the first light-emitting elements per column are arranged along an extending direction of the splicing seam;
the second surface is disposed a side of the first surface close to the splicing seam and inclines towards the splicing seam relative to the first surface; and
at least two columns of second light-emitting elements are disposed on the second surface, and the second light-emitting elements per column are arranged along the extending direction of the splicing seam.

* * * * *